United States Patent [19]

Piltz et al.

[11] Patent Number: 4,813,208
[45] Date of Patent: Mar. 21, 1989

[54] METHOD AND DEVICE FOR SCRAP-FREE MANUFACTURE OF COATED PROFILES AND THERMOFORMED CONTAINERS

[75] Inventors: Lars E. Piltz, Dalby; Lennart Larsson, Malmö, both of Sweden

[73] Assignee: AB Akerlund & Rausing, Sweden

[21] Appl. No.: 55,241

[22] Filed: May 28, 1987

[30] Foreign Application Priority Data

Jun. 2, 1986 [SE] Sweden ................ 8602484
Jun. 6, 1986 [SE] Sweden ................ 8602561

[51] Int. Cl.$^4$ ............................ B65B 43/08
[52] U.S. Cl. ........................ 53/449; 53/456; 156/203; 156/244.13; 156/244.18; 493/287; 493/293
[58] Field of Search .............. 53/449, 456, 140, 172, 53/547; 156/244.13, 244.18, 203, 426, 466; 493/211, 293, 287, 194

[56] References Cited

U.S. PATENT DOCUMENTS

| 2,757,695 | 8/1956 | Reichel | 156/244.18 X |
| 2,767,431 | 10/1956 | De Lauzarede | 53/140 X |
| 3,056,339 | 10/1962 | Sommerfeld | 493/293 X |
| 3,114,301 | 12/1963 | Reifenhauser | 493/293 X |
| 3,354,601 | 11/1967 | Schneider | 53/547 X |
| 3,561,048 | 2/1971 | Ernst | 493/293 X |
| 3,733,381 | 5/1973 | Willette | 156/244.18 X |
| 4,062,712 | 12/1977 | Stark | 156/244.13 |

Primary Examiner—John Sipos
Attorney, Agent, or Firm—Lerner, David, Littenberg, Krumholz & Mentlik

[57] ABSTRACT

A method and a device for scrap-free manufacture of coated profiles and thermoformed containers.

A hollow pipe having a cross-section suitable for the desired profile is extruded.

The extruded hollow profile is cut longitudinally.

Thereafter the profile is planar laminated by a web formed material having desired characteristics.

The cut, laminated profile thereafter is formed into the original shape thereof, or another suitable shape, and is formed into container casings.

When thermoforming containers, a hollow profile is extruded from a thermoformable material in an extruder, this hollow profile is cut, in one or several longitudinal cuts. In web or roller form such cut profile is supplied to a so called scrap-free thermoforming machinery, where the thermoformed containers are manufactured.

8 Claims, 6 Drawing Sheets

METHOD AND DEVICE FOR SCRAP-FREE MANUFACTURE OF COATED PROFILES AND THERMOFORMED CONTAINERS

FIELD OF THE INVENTION

The present invention relates to a method and a device for manufacturing of coated profiles, preferably for containers and for thermoforming of containers. More precisely, the invention relates to scrap-free manufacturing of a container body to be closed by at least one end piece and scrap-free thermoforming of containers, respectively.

BACKGROUND OF THE INVENTION AND PRIOR ART

The problem of the present invention is to minimize the scrap when manufacturing packages, especially packages having qualified barrier characteristics, for instance of the quality required for full conserves.

According to a specific embodiment of the invention, the problem of the invention is to make the total procedure, from plastics granulate to a finished packing container, waste or scrap-free, starting out from so called "scrap-free" thermoforming technique.

The general problem of minimizing waste has, of course, been dealt with before and it is known to extrude an extrudate in pipe form and laminate such pipe by a barrier material.

In the Swedish patent No. 751017069 (same as U.S. Pat. No. 4,484,968) there is shown a method of applying a barrier laminate cross-wise an extruded pipe.

According to another method, described in Swedish patent application No. 850170160, the starting point is a profile, which may be solid or hollow, and strips are applied in the longitudinal direction of the profile.

In the first mentioned case, where the extrudate is a hollow extrudate, and in the last mentioned case, when the extrudate is a hollow profile, there if obtained an absolutely scrap free manufacture of the 'supporting container' casing requiring the largest amount of material, i.e. the seamless inner layer.

That, which has been said, is one of the reasons for making extrusion of hollow profiles a most competitive approach to the package manufacturing technique. The dimension of the extrudate defines exactly the dimension of the casing of the container without any need for scrap introducing working, for instance edge cutting. However, according to one embodiment of the present invention further working includes a thermo forming process of the so called scrap-free type.

According to prior art, webs obtained by planar extrusion of plastics through a straight orfice onto a mould roller, in contrary to the cut profile of the present invention, obtain marginal regions which do not meet the stipulated tolerances, implying that such marginal regions have to be removed as waste material, for instance by roller cutting.

However, when extruding pipes and cutting such into casings, the transport volume, from the manufacturing place of the casings and the packages to the filling place, if said locations are geografically separate, will be pretty large and "air containing".

The prior art lamination operations are carried out against a support which perhaps does not always provide a sufficient pressure for lamination, meaning there is a risk for air bubbles and an inferior end product.

In certain cases the prior art lamination methods do also imply problems with matching the print of the package.

SUMMARY OF THE INVENTION

The object of the present invention is to offer alternatives to the known methods and broaden the concept of scrap-free manufacturing of a container casing and a thermoformed container by starting out from a hollow profile, which by being cut longitudinally in a waste free manner is given well defined edge regions without any need for subsequent working, at least not scrap introducing working.

The invention provides a method of scrap-free manufacturing of a coated profile, preferably a container casing.

The method is characterized in that the hollow profile with a cross section, possibly obtained after calibration, suitable for, preferably identical to, the desired profile is extruded from an extrudable material in an extruder, that the profile is cut longitudinally, and that the cut profile is planar laminated by a strip type of material having the desired characteristics.

Preferably, a container casing of a predetermined length is manufactured from the cut, laminated profile, for instance by reshaping to the original shape, sealing the body longitudinally and cutting it.

In order to allow a so called in-plant forming of a container, the planar laminated, cut profile is delivered in roller form to the place for manufacturing container casings. After such casings have been manufactured, each one is provided with a first end piece or sealed cross-wise, the end sealed container casing is filled with a product, and the container casing is closed by a second end piece or by a cross-wise seal.

In another embodiment where the manufacturing of the package and the filling thereof are carried out geographically at the same place, the container casing is manufactured in line with the planar lamination, and the container casing is provided with a first end piece, the end sealed container casing is filled with a product, and finally the container casing is closed by a second end piece or by a cross-wise seal.

In order to obtain a high barrier package, the strip shaped material is selected as a material having qualified gas and water vapour barrier characteristics, for instance a material comprising a metal foil, metallized plastics material or a laminate of high barrier plastics.

A preferred embodiment of end pieces, one or two, comprises an end piece formed as a layer structure, where an outer layer, preferably of plastics, acts as a mechanically protective barrier and a layer inside said layer acts as a barrier layer.

The wall thickness of the extruded hollow profile is determined by the size of the package, however, wall thicknesses in the interval 0.2 to 1.0 mm are preferable.

According to a further embodiment, the present invention provides a method for a waste or scrap-free manufacture of packing containers. The method is characterized in that the hollow profile is extruded from a thermoformable material in an extruder, that the hollow profile is cut longitudinally, and that the cut hollow profile in web or roller form or as individual blanks, is supplied to a so called scrap-free thermoforming machinery, for manufacture of said packing containers.

In one specific embodiment the hollow profile is coextruded, the combination of material is selected such that the hollow profile is given high gas and vapour barrier characteristics, and such that the thermoformed packing container will be heat sealable.

The longitudinal or lengthwise cutting may comprise one or several cuts, dependent on the cross section of the hollow profile and the desired size for the thermoforming operation, which is to follow.

The wall thickness of the extruded hollow profile exceeds considerably the film thickness of so called blown films and is at least approximately 0.2 mm.

The cut hollow profile may also be planar laminated if necessary, for instance by a metal foil before further process steps are applied.

The invention also provides a device for scrap-free manufacture of a coated profile, preferably a container casing.

The device is characterized by an extruder for extruding a hollow profile having a cross section, possibly after calibration, suited for, preferably equal to, the cross section of the profile, by a device for cutting longitudinally the profile, and by a device for planar lamination of the cut profile with the strip shaped material having desired characteristics.

In one embodiment, where the coated profile is a container casing, there is a device for manufacturing of container casings from cut, laminated profiles.

Said device for manufacture of container casings comprises preferably a forming device for forming the profile into the original shape, a device for sealing the formed profile longitudinally, and a cutter device for cutting the sealed profile into the predetermined lengths.

Preferably, the device for sealing longitudinally comprises a strip applicator for applying a strip in the longitudinal joint in order to seal and/or form a barrier.

The invention will now be exemplified by reference to the accompanying drawings.

DESCRIPTION OF PREFERRED EMBODIMENTS

Figure 1:
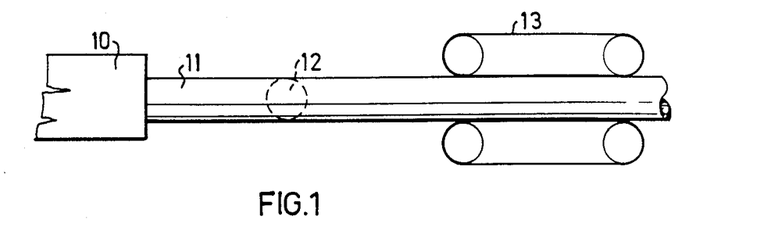
FIG. 1 in a schematic side view shows the extruder in a line for manufacturing containers according to the present invention.

The extruder 10 in FIG. 1 provides an extrudate 11 in pipe form having a circular cross section 12. The extrudate may comprise a thermoplastic material, for instance polyprophylene or a copolymer comprising polyprophylene having a thickness in the interval approximately 0.2–1.0 mm. Having in mind that the material normally forms part of a package which is to withstand high temperatures at sterilisation, polyprophylene or suitable copolymeres are preferable.

If so desired a suitable calibration device (not shown) may be arranged between the extruder 10 and a pulling bench 13. It is essential that the cross section of the extruded pipe basically corresponds to the cross section of the desired container casing.

Figure 2:
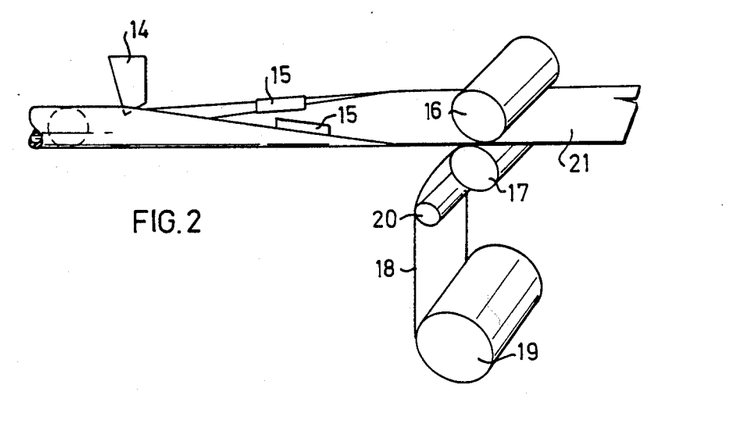
FIG. 2 shows the cutting and laminating units of the manufacturing line.

A cutting device 14 is arranged for cutting the pipe 11 in the longitudinal direction. Downstreams said cutting device there is arranged guide rails 15 for guiding the cut pipe or hollow profile into such a "flattened" shape that it will be insertable in the nip of a planar lamination unit, comprising laminating rollers 16, 17 and a glue applicator (not shown) and a drying unit (not shown).

To the laminating nip between the rollers 16, 17 there is fed a web 18 of a high barrier material, for instance aluminium foil, from a storage roller 19. The material is fed over a guide roller 20. The term "planar lamination" means general methods for laminating between pairs of rollers, for instance lamination by use of a two component glue or some more up to date version of hot melt, for instance "MOREPRIME". As is well known, planar lamination is very reliable and the risk for the entrapped air spaces mentioned in the introduction is practically not existing.

Usually, the web 18 is a laminate or a metal foil which has been coated on both sides thereof or lacquered. Generally there is required a so called roller cutting operation for obtaining the correct web width. In spite of the fact that certain waste cannot be avoided, such waste does not comprise waste containing also the thick material of the hollow profile.

Figure 3:
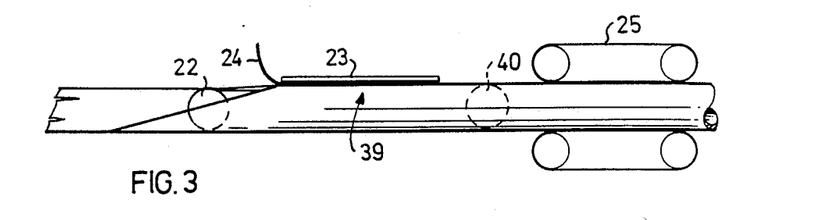
FIG. 3 shows the pipe forming unit of the line.

Following to the planar lamination operation, the cut pipe or laminate 21 is represented by the web 18 and the cut pipe 11. This laminate is fed to a forming and welding station 39 comprising a forming member 22 and a weld device 23, for instance a high frequency welding equipment, for providing a longitudinal joint. Preferably, a sealing strip 24 is used and attached against the joint, and the weld may be a but weld. Alternatively, there may of course be an overlap joint.

Figure 4:
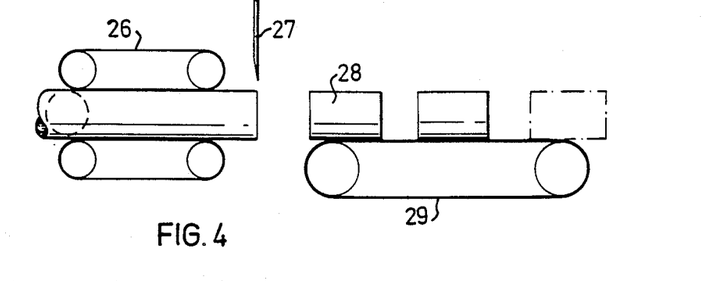
FIG. 4 shows the cutting unit of the line.

Pulling benches 25 and 26 transport the formed and welded or sealed pipe to a cutter 27. Individual container casings 28 are transferred to a conveyor 29. This conveyor transports the containers to a bottom applicator unit, shown by a single arrow 30, for mounting of a bottom piece 31.

The structure of such a bottom is basically described in the publications mentioned at the introduction. It may be mentioned that the end piece, top or bottom piece, comprises an outer layer, generally of plastics, and a barrier layer, for instance of aluminium foil, arranged inside the plastics layer.

Figure 5:
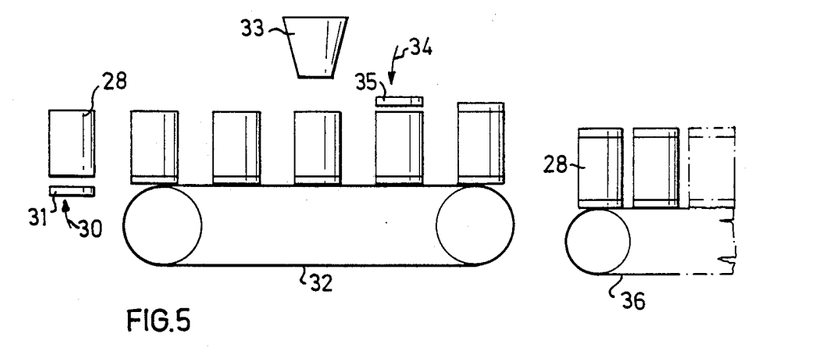
FIG. 5 shows the filling and sealing unit.

A further conveyor 32 transports the containers 28 having bottom pieces thereon to a filler 33. Thereafter an end sealing station 34 is arranged for applying a top piece 35, basically of the same type as the end piece 31, however, usually without any arrangement for easy opening. The ready packed and sealed container 28 finally arrives at an output conveyor 36 leading to a packing station (not shown).

The line just described is an integrated container manufacturing and filling line. In FIGS. 6–11 there is shown another application.

Figure 6:
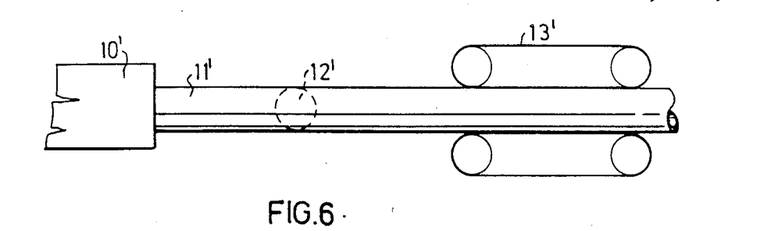
FIG. 6 in a schematic side view shows the extruder of another manufacturing line according to the present invention.
Figure 7:
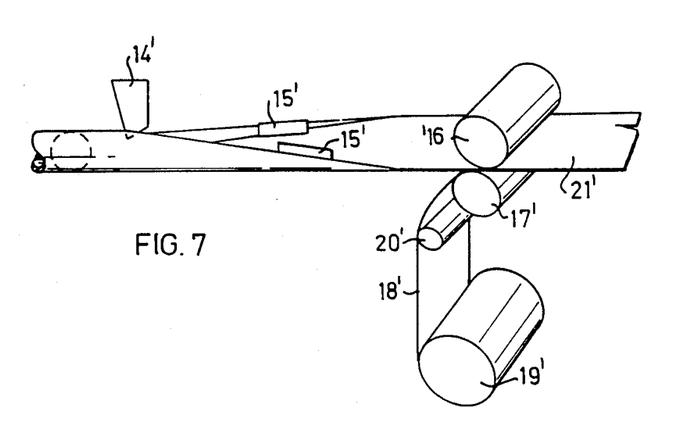
FIG. 7 shows the cutting and laminating units or stations of the line.

The arrangement and the procedure, respectively, in FIGS. 6 and 7 coincides exactly with what is shown in FIGS. 1 and 2. Reference numbers just having an addition of a prime sign have been used in FIGS. 6 and 7.

Figure 8:
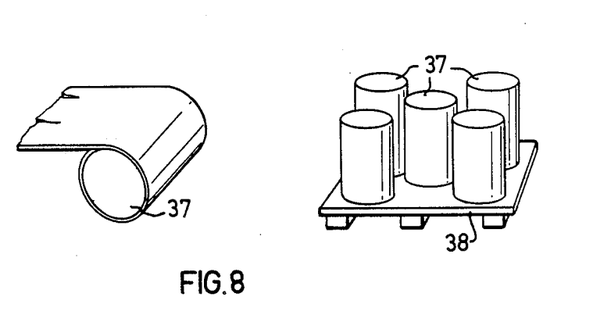
FIG. 8 shows the roller unit and palleting station.

In FIG. 8 there is shown how the cut, laminated hollow profile forming the web 21' is winded up to a roller 37. Such rollers 37 thereafter are placed transport ready on a pallet 38. The object of this is to offer an in plant manufacture of containers starting out from the roller material.

Figure 9:
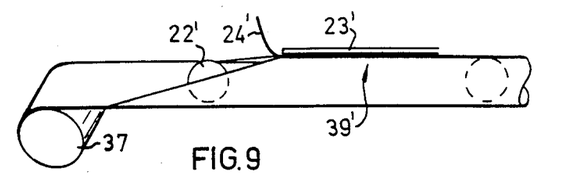
FIG. 9 shows the pipe forming unit of an inplant line for manufacturing of containers.
Figure 10:
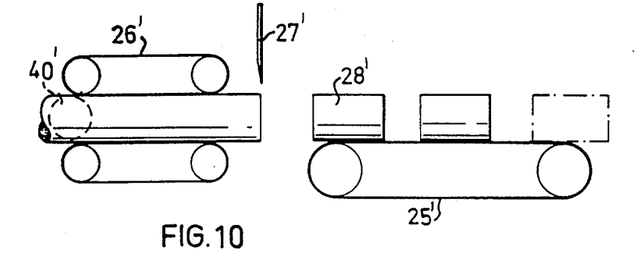
FIG. 10 shows the cutter unit of the line.
Figure 11:
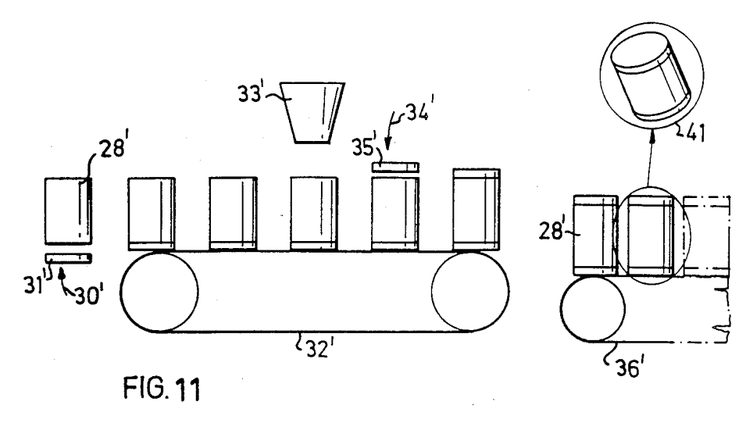
FIG. 11 shows the filling and end sealing unit of the line.

FIGS. 9–11 illustrate a "plant" or filling unit. From a roller 137 a web of material 121' is withdrawn, comprising the "flattened" pipe material laminated to a barrier material 18, and is formed and welded in a station 39', identical to the station 39.

The ready-formed and longitudinally sealed pipe 40' is drawn by a pulling bench 26' towards a cutter 27'. This one cuts the pipe into container casings 28' of the desired length.

The conveyor 25' feeds the casings to the arrangement in FIG. 11, which is identical to the one in FIG. 5.

Inside the circle 41 in FIG. 11 there is shown in a perspective view what the finished containers look like.

Figure 12:
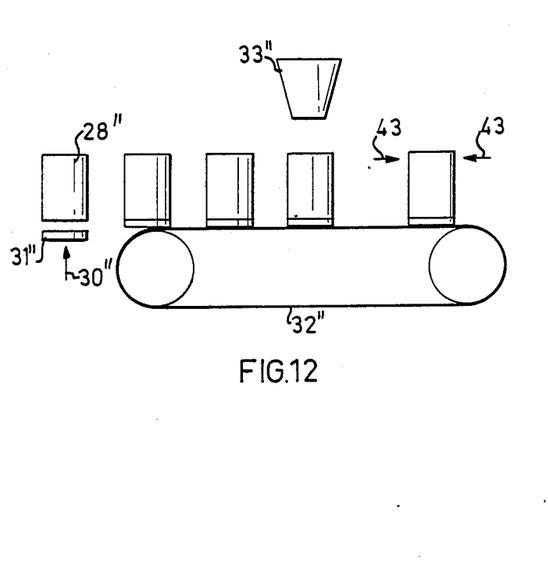
FIG. 12 shows an alternative embodiment of an end sealing unit, where one end of each container casing is sealed crosswise, and FIG. 13 schematically shows scrap-free manufacture of thermoformed containers or cups.

Inside the circle 42 in FIG. 12 there is shown an alternative design, where instead for an end piece 35' there has been accomplished a cross seal 35'', basically of "tube type". The double arrows 43 in FIG. 12 indicate the cross sealing station where the seal 35' is accomplished, in an arrangement which for the rest is identical to the one in FIG. 11 and which therefore has the same reference numerals with the additional of a biss-sign.

Figure 13:
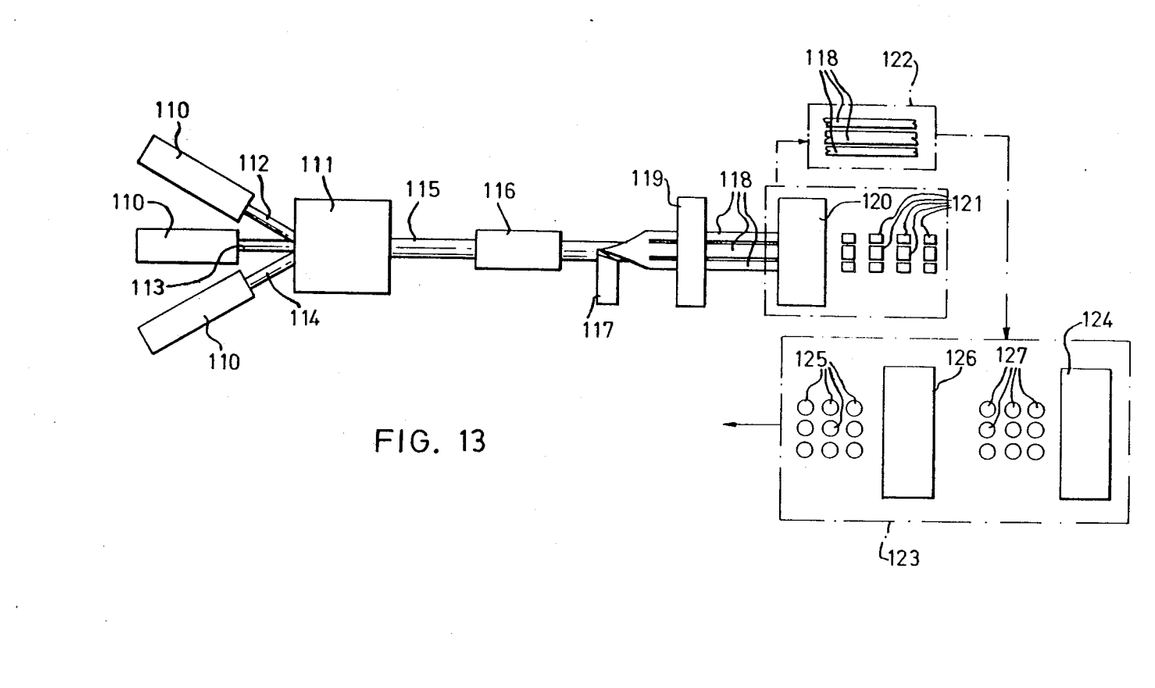

In FIG. 13 the reference number 110 denotes three extruders, each one supplying a flow of material 112, 113 and 114, respectively, to an extruder head 111. In this particular case, at the output from the head 111, there is obtained a hollow profile in the form of a pipe 115 having a circular cross section and comprising three material layers 112, 113 and 114, where the mid layer for instance may be a gas and vapour barrier layer of "SARAN" and inner and outer layers of polyprophylene.

A calibrator 116 may, if so required, be inserted between the extruder 111 and a cutter station 117. In the station 117 the profile 115 is cut longitudinally, in this case in three strips or webs 118. A pulling bench 119 is arranged for pulling the webs 118 to a cutter, the output of which is a foursided blank.

The cutting operation may also be deleted, which is indicated by the encircled section 122. In this case the webs 118 are supplied directly or in roller form for the subsequent processing.

In this particular case such processing or manufacture takes place in a machinery 123, being a thermoforming machinery of the so called scrap-free type. The machinery is of a well known type, for instance of the type provided by Cincinnatti Milacron, OH, USA.

The machinery has an embossing station 120, where blanks are formed waste free into a size adapted to the final size of a container or tray 125 to be produced in a thermoforming station 126' from the embossed or preformed blank 127. The preforming or embossing generally means a scrap-free redistribution of the material of the blanks or webs 118, which are used, for instance redistribution from a foursided contour into a round contour or a thinner centre region than the marginal region.

Although specific embodiments have been described and shown on the drawings, it is realized that modifications and alternatives are possible within the scope of the claims. Instead of scrap-free thermoforming in the last embodiment there may for instance be used a traditional thermoforming machinery when manufacturing foursided packing containers from the cut, extruded pipe.

We claim:

1. A waste-free method of manufacturing a multi-layered article having a profile with a predetermined perimeter comprising the steps of:
   a. forming a longitudinally-extending thermoplastic material into a tubular profile having substantially said predetermined perimeter;
   b. cutting said thermoplastic material having said tubular profile in said longitudinal direction thereof so as to provide a substantially planar sheet having a width corresponding to said predetermined perimeter;
   c. laminating by planar lamination said substantially planar sheet with a web material so as to form a laminate therefrom; and
   d. reforming said tubular profile from said laminate so that said reformed tubular profile has said predetermined perimeter.

2. A waste-free method of manufacturing a multi-layered profile as claimed in claim 1, including calibrating said hollow profile after formation so as to insure that said hollow profile has said predetermined perimeter of said multi-layered article.

3. A waste-free method of manufacturing a multi-layered article having a profile with a predetermined perimeter as claimed in claim 1, wherein said web material has high gas and vapor barrier characteristics.

4. A waste-free method of manufacturing container casings comprising multi-layered articles having a profile with a predetermined perimeter comprising the steps of:
   a. forming a longitudinally-extending thermoplastic material into a tubular profile having substantially said predetermined perimeter;
   b. cutting said thermoplastic material having said tubular profile in said longitudinal direction thereof so as to provide a substantially planar sheet having a width corresponding to said predetermined perimeter;
   c. laminating by planar lamination said substantially planar sheet with a web material so as to form a laminate therefrom;
   d. reforming said tubular profile from said laminate so that said reformed tubular profile has said predetermined perimeter;
   e. sealing the profile in the longitudinal direction thereof; and
   f. cutting the profile in a lateral direction to form said container casings.

5. A waste-free method of manufacturing a container casing as claimed in claim 4, wherein said container casing includes a first end and a second end and including covering said first end of said container casing with a first end piece.

6. A waste-free method of manufacturing a container casing as claimed in claim 4, including sealing said first end of said container casing with a crosswise seal.

7. A waste-free method of manufacturing and filling a container casing comprising a multi-layered article having a profile with a predetermined perimeter comprising the steps of:
- a. forming a longitudinally-extending thermoplastic material into a tubular profile having substantially said predetermined perimeter;
- b. cutting said thermoplastic material having said tubular profile in said longitudinal direction thereof so as to provide a substantially planar sheet having a width corresponding to said predetermined perimeter;
- c. laminating by planar lamination said substantially planar sheet with a web material so as to form a laminate therefrom;
- d. reforming said tubular profile from said laminate so that said reformed tubular profile has said predetermined perimeter;
- e. sealing the profile in the longitudinal direction thereof;
- f. cutting the profile in a lateral direction to form said container casings including a first end and a second end;
- g. sealing said first end of said container casing;
- h. filling said container casing with a filler material; and
- i. sealing said second end of said container casing.

8. A waste-free method of manufacturing a multi-layered article having a profile with a predetermined perimeter as claimed in claim 1, wherein said step of reforming includes abutting two longitudinal edges of said laminate and applying a sealing strip to said abutted longitudinal edges.

* * * * *